M. B. AND V. C. KENNEDY.
COMPUTING MACHINE.
APPLICATION FILED SEPT. 25, 1920.
1,400,363.
Patented Dec. 13, 1921.
4 SHEETS—SHEET 1.
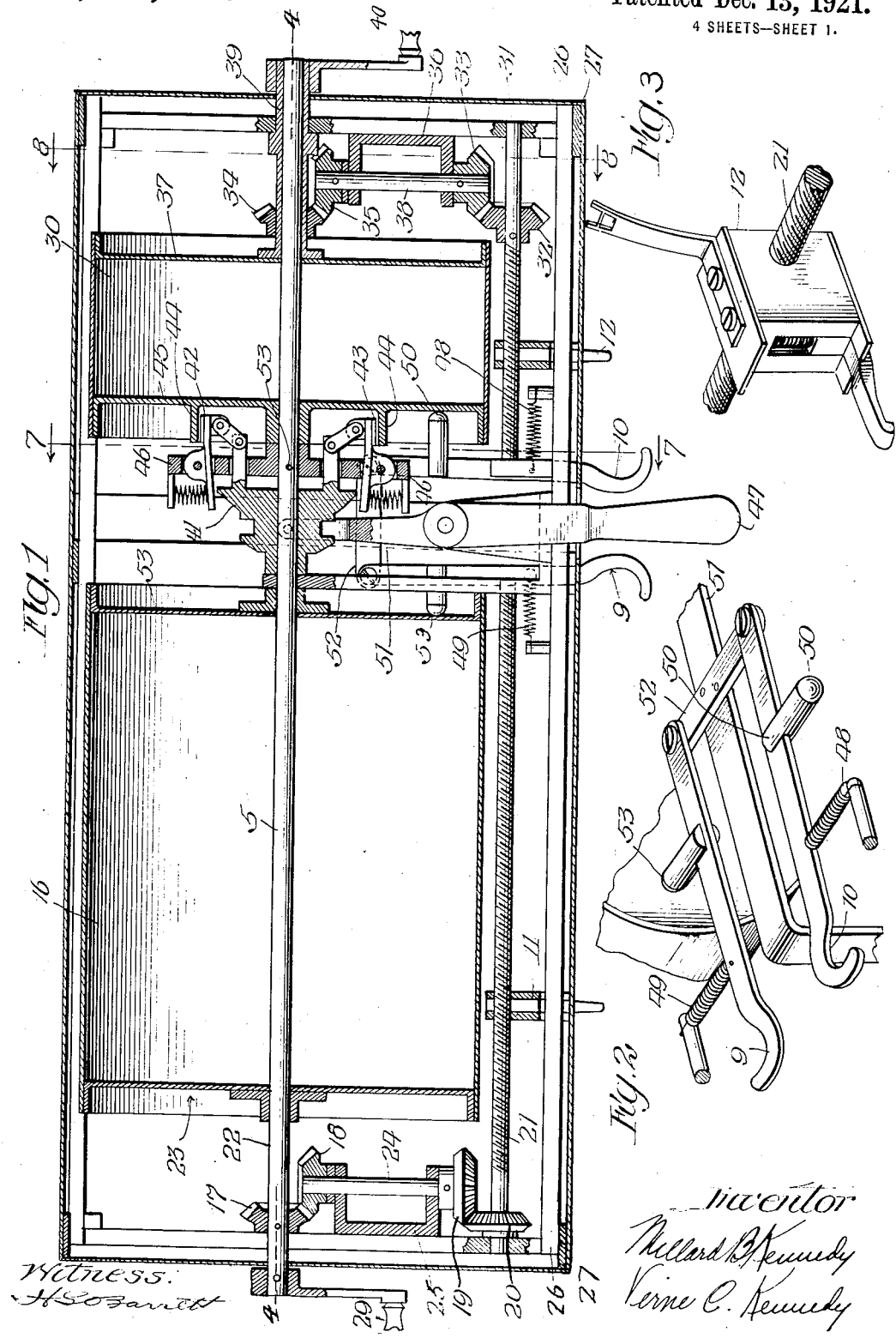

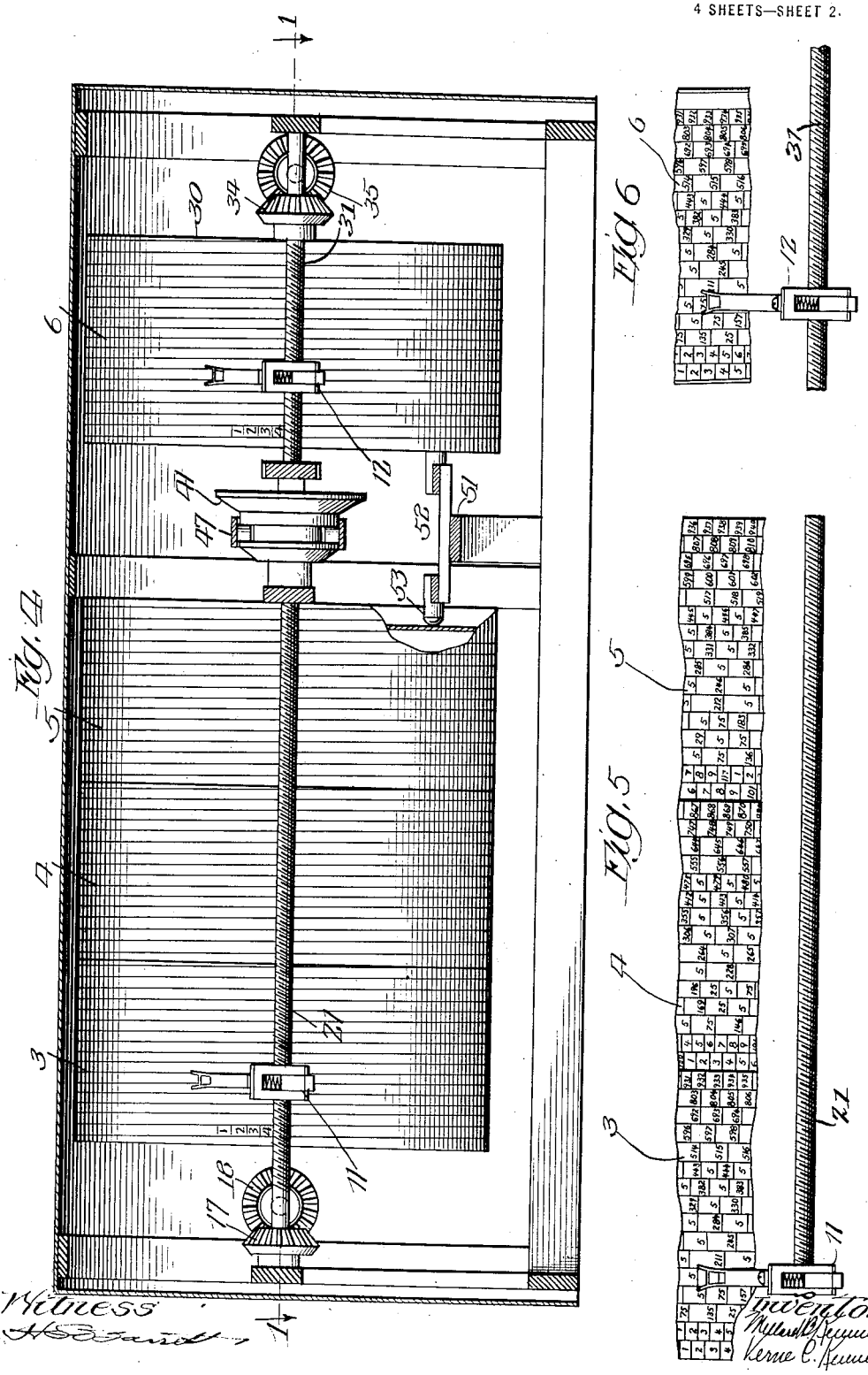

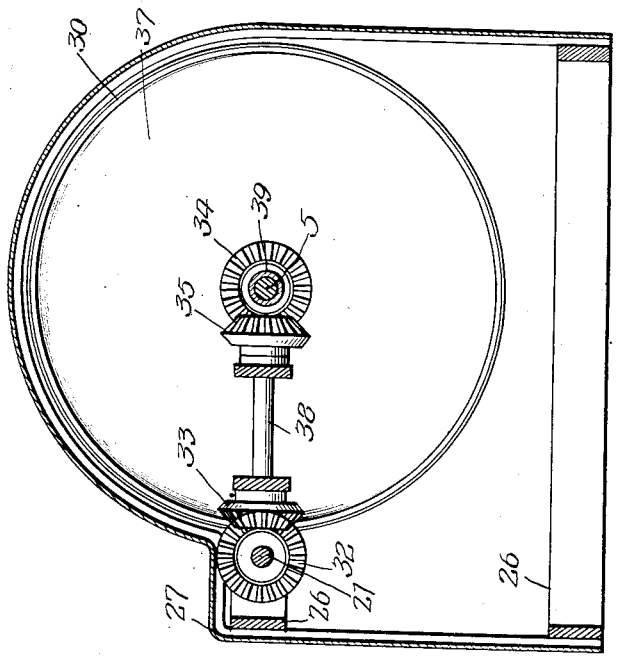

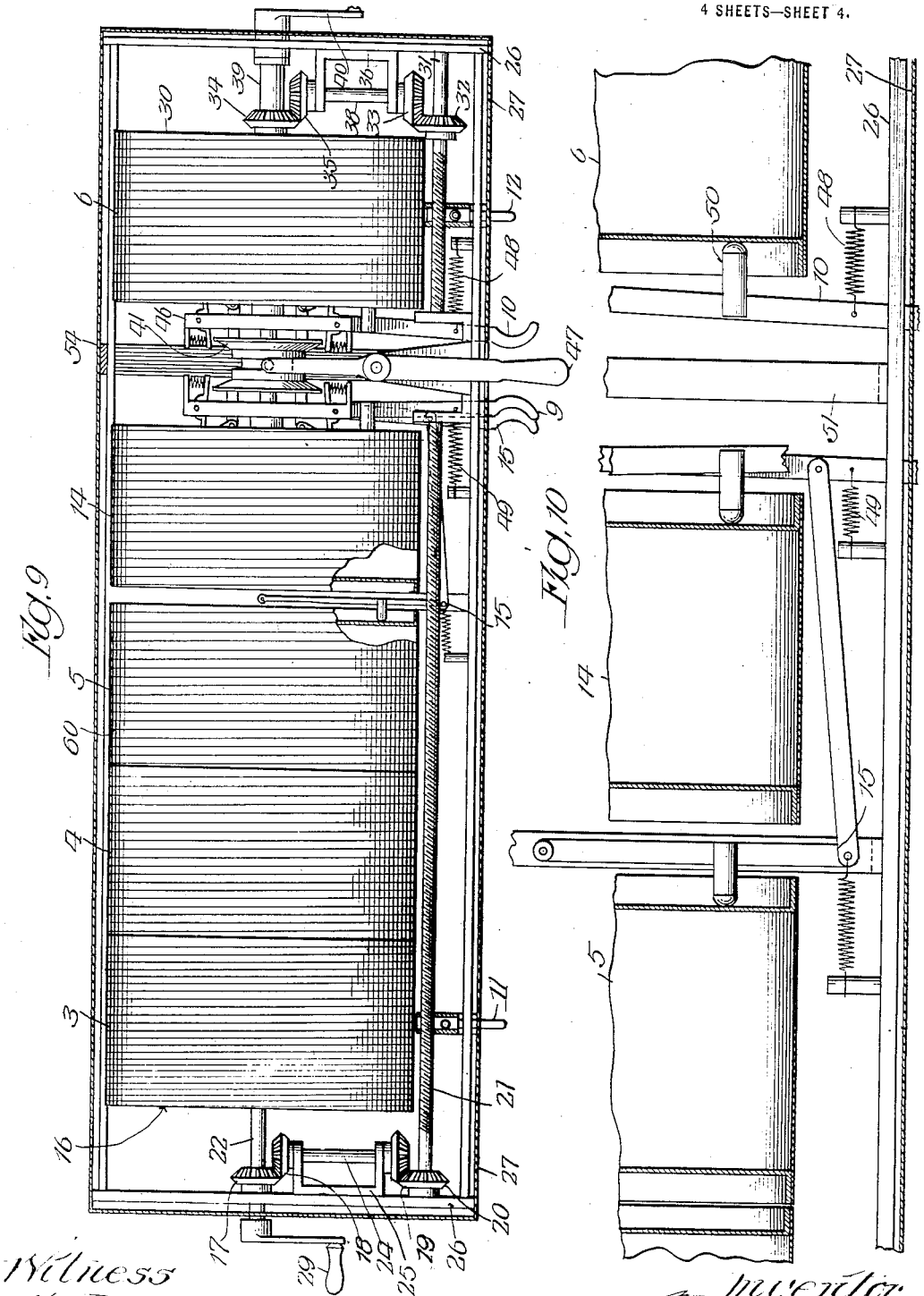

UNITED STATES PATENT OFFICE.

MILLARD B. KENNEDY AND VERNE C. KENNEDY, OF CANTON, SOUTH DAKOTA.

COMPUTING-MACHINE.

1,400,363.  Specification of Letters Patent.  Patented Dec. 13, 1921.

Application filed September 25, 1920. Serial No. 412,772.

*To all whom it may concern:*

Be it known that we, MILLARD B. KENNEDY and VERNE C. KENNEDY, both citizens of the United States, and both residents of Canton, in the county of Lincoln and State of South Dakota, have invented certain new and useful Improvements in Computing-Machines, of which the following is a specification, reference being had to the accompanying drawings.

The subject matter of the invention refers to an apparatus for computing by means of a plurality of related scales, and especially logarithmic scales, which are movable both in relation to each other and in conjunction with each other. Several different sets of related scales may be combined in the same device as hereinafter specified.

With this and other incidental objects in view, the following is a specification of the invention, reference being had to the accompanying drawings. It is understood that various changes in form, proportion and size and minor details may be had without departing from the spirit of the invention.

Figure 1 is a horizontal cross section of one form of the invention, through line 1, 1 of Fig. 4.

Fig. 2 is a detailed view of friction brakes 9 and 10.

Fig. 3 is an enlarged view of indicators 11 and 12.

Fig. 4 is a vertical cross section through line 4, 4 of Fig. 1.

Fig. 5 is a detailed view of a small portion of scales 3, 4 and 5.

Fig. 6 is a detailed view of a small portion of scale 6.

Fig. 7 is a cross section through line 7, 7 of Fig. 1.

Fig. 8 is a vertical cross section through line 8, 8 of Fig. 1.

Fig. 9 is a top view of a modified form of the invention.

Fig. 10 is an enlarged view of friction brake 15.

The apparatus shown in the accompanying drawings consists of a logarithmic scale 3 in the shape of a spiral so mounted as to be movable with reference to, and in conjunction with other scales, preferably upon a cylinder 16. This scale may be repeated any number of times, as scales 4 and 5. The number of repetitions of the scale depending upon the plurality of computations desired without resetting the scale to its index. Any suitable indicator, such as the indicator shown in Fig. 3 is so mounted that it travels along the face of the logarithmic scale and indicates at any time the division on such scale from its index, to such indicator. In the illustrated form of the invention this is accomplished by means of the gear 17 which is connected to the shaft 22 upon which the cylinder 16 is mounted by means of the disk 23. Gear 17 meshes with gear 18 which is mounted upon shaft 24, upon which gear 19 is mounted. Shaft 24 is supported by means of bracket 25 which is attached to the upright of the frame of the machine 26. Gear 19 meshes with gear 20 which is mounted upon screw 21 upon which threads are cut, and upon which indicator 11, in which threads are tapped, is mounted. It is evident that when cylinder 16 is caused to revolve that the indicator 11 will be caused to move across the face of cylinder 16 by means of screw 21. The threads of screw 21 are cut to such pitch that indicator 11 will move across the face of cylinder 16 in unison with the spiral scales 3, 4 and 5 mounted upon the face of such cylinder. Such indicator will then at any time denote the division upon such scale from its index. Each indicator is equipped with a release lever by means of which it may be moved across the face of the cylinder and set to the desired position with a minimum of rotation of the cylinder. A different form of indicator and a different mechanical connection between its movement and that of scales 3, 4 and 5 may be adopted without departing from the spirit of the invention.

Any suitable means for turning cylinder 16 is provided such as handle 29 which is mounted upon shaft 22. The entire mechanism is supported in a suitable frame, such as frame 26, which supports shaft 22, bracket 25 and shaft 20.

A logarithmic scale in the form of a spiral, such as scale 6, is mounted so as to be movable in respect to scales 3, 4 and 5 or in conjunction with said scales. This is preferably mounted upon a cylinder 30 in the same manner as scales 3, 4 and 5 are mounted upon cylinder 16. Scale 6 is equipped with an indicator 12, similar to indicator 11 which indicates the division at any point upon said scale from its index point. Indicator 12 is mounted upon the lead screw 31, which is in turn connected with cylinder 30 by means of gears 32, 33, 34 and 35 and shaft 38. Gear 34 is mounted upon the hollow shaft 39 which is connected to cylinder 30 by means of the circular disk 37.

In the accompanying drawings, cylinders 16 and 30 are shown as of the same diameter and the scales mounted upon their surfaces are shown as of the same length, the scale on cylinder 16 being repeated three times. The gears connecting indicator 11 to cylinder 16 are shown as of the same size as the gears connecting cylinder 30 to indicator 12. The screws 21 and 31 are also shown of the same pitch. It is evident that any movement of cylinder 16 would cause indicator 11 to move the same distance over the surface of scales 3, 4 and 5 or one of them, as the same movement of cylinder 30 would cause the indicator 12 to move along scale 6. It is also evident that the same angular movement of the two cylinders would cause the indicator upon each cylinder to move the same distance, and assuming that the indicator was situated upon each scale at the same point of the scale at the time of beginning the movement, each indicator would have traveled a relatively equal distance over its scale at the time the movement ceased. If for any reason it is desired that one cylinder shall be of a different diameter than the other cylinder, or that one scale be of a different length than the scale upon the other cylinder, then the mechanical gearing which connects the indicators to their respective cylinders should be so modified that when scale 3, or scales 3, 4 and 5, are moved in conjunction with scale 6, the indicator to cylinder 16 would travel a relatively equivalent distance over its scales as the indicator 12 to cylinder 30 traveled over scale 6. For illustration in the accompanying drawings, both cylinders being shown as the same size and scale 3 being shown as of the same basic length as scale 6, then when cylinders 16 and 30 are turned in conjunction with each other, indicator 11 will pass the same distance over scale 3 as indicator 12 passes over scale 6. But if scale 6 were constructed upon a basic length of twice the basic length of scale 3, then it would be necessary to so construct the gearing of indicator 12 that it would pass over twice the actual distance on scale 6 as indicator 11 passed over on scale 3, although both indicators would pass over the same relative distance of their respective scales. In certain mathematical calculations it is desirable that the indicator on one scale should pass over a multiple of the distance, or relative distance, of the other scale. This may be accomplished as hereinafter discussed.

In this discussion the term "passed over the scale" is used with reference to the indicator, and is intended to include cases where the scale passes through or past the indicator.

Cylinder 30 is equipped with any suitable device for turning the cylinder, such as hand crank 40, which is fastened to the hollow shaft 39, which is in turn connected to cylinder 30.

Cylinders 16 and 30 are equipped with any suitable device which permits the operator to move each cylinder separately or in conjunction with the other. In the accompanying drawings this is accomplished by means of clutch 41 which is connected to cylinder 16 by means of pin 53 through bar 46. When the lever 47 is moved to the right the clutch is disengaged and each cylinder may be operated separately by means of its respective crank. When lever 47 is moved to the left the friction jaws 42 and 43 are caused to expand and engage with the inner surface of the drum 44 which is connected with cylinder 30 by means of disk 45. When clutch 41 is thus engaged any movement of one cylinder produces a corresponding movement of the other cylinder, and the indicator of each cylinder would travel accordingly.

In order to prevent any movement of the cylinders except when desired by the operator any suitable device such as friction brakes 9 and 10 are employed. These are mounted upon bar 51 by means of the cross bar 52. Bar 51 is mounted upon frame 26. Each brake lever is fitted with a rubber stop 50 and 53 and with a spring 48 and 49 respectively. Springs 48 and 49 are mounted upon the frame 26 in such manner that they exert tension upon the levers 10 and 9 respectively and hold the rubber stops 50 and 53 against the end disks of cylinders 30 and 16 respectively, unless either or both of the levers are pressed to the side by the operator in such manner as to disengage stop 50 or 53 from its friction pressure upon its respective cylinder. In this manner any unintentional movement of the cylinders is prevented.

It is evident that there is no theoretical limitation to the number of related cylinders or scales which may be combined, the only limitation being the desired size of the apparatus.

Fig. 9 illustrates a modification where three cylinders are employed. In this drawing all the cylinders are of the same diameter and each has the scale upon its face constructed upon the same base. However, the previous discussion as to scales constructed upon different bases as to length or to cylinders of different size would apply here. The third cylinder 60 is provided with brake 15 of similar construction to brakes 9 and 10, and the clutch 41 is modified by having a duplicate 54 constructed opposite 41. The construction of the side 54 is identical with 41, so that when the lever is at right angles to the clutch the jaws will not engage either drum and each cylinder will move independent. If the lever 47 is moved to the right then cylinder 60 will engage with cylinder 16 and if lever 47 is moved to the left cylinder 30 will be engaged with cylinder 16.

The various shafts, screws and brackets such as 22, 25, 21, 47, 31, 39 etc. are supported by means of a suitable frame as frame 26.

If it is found desirable several parallel scales may be mounted in spiral form on each cylinder, the scales being stationary with reference to the other scales in the same spiral but movable with reference to and in conjunction with the scales in the other spiral.

The scales may be constructed in the form of flat spirals if desired, although the preferred form of the invention is to mount them on cylinders as illustrated in the accompanying drawings.

The method of performing a mathematical calculation such as multiplication by means of this device is as follows; if it is desired to multiply the number 125.5 by the number .678, the lever 47 would be pushed to the right so as to disengage cylinders 16 and 30. Indicator 11 would be set at the figures 1255 on scale 3. Brake 9 would then be released so as to engage with the end disk of cylinder 16. Indicator 12 would then be set at the left index 100 on scale 6. Brake 10 is then allowed to engage with cylinder 30 and clutch 41 is engaged with drum 44 by moving lever 47 to the left. Both brakes 9 and 10 are then released by the operator and cylinders 16 and 30 turned in conjunction with each other by means of either crank 29 or 40, until the figures 678 appear at the cross hair of indicator 12. The product of the two numbers will then appear at the cross hair of indicator 11 on one of the scales 3, 4 or 5 on cylinder 16. The position of the decimal point is determined by the well known mathematical rule used in computations with slide rules. If the product of the numbers multiplied appears on scale 3, the number of digits to the left of the decimal point will be one less than the sum of the characteristics of the two factors multiplied. If the result appears on scale 4, the number of places to the left of the decimal point will be equal to the sum of the characteristics of the two factors multiplied, and if the result appears on scale 5 the number of places to the left of the decimal point will be one greater than the sum of the characteristics of the factors multiplied together.

If an operation of division is to be performed, the indicator on cylinder 16 would be so set that the dividend appears at its cross hair, and the indicator on cylinder 30 would then be set so that the divisor appears at its cross hair; the two cylinders would then be engaged by means of the clutch 41 and rotated until the left index of scale 6 appeared at the cross hair of indicator to scale 6 on cylinder 30. The quotient would then appear at the cross hair of indicator 11 on cylinder 16. If the quotient appears upon scale 3, its characteristic is the characteristic equal to the difference of the characteristic of the divisor subtracted from the characteristic of the dividend plus one.

In the foregoing discussion the index of the scale is the end of the scale and is designated by the figures 100. The left index is the beginning and the right index the end of the scale.

It is evident that a series of multiplications and divisions may be performed, such as $1254 \times 369 \div 64.8 \times 93$, by disengaging the two cylinders after each operation and resetting the indicator to scale 6 on cylinder 30 and again engaging the two cylinders and rotating them until the desired figures appear at the cross hair of the indicator to scale 6 on cylinder 30, the only limit to the length of the series of multiplications and divisions being the number of repetitions of the scale upon cylinder 16.

If it is found desirable means may be provided whereby the indicators to the two cylinders may be moved in unison across the face of their respective cylinders, without rotation of the cylinders.

If it is found desirable to perform other operations than those of multiplication and division, such as the operations of raising a number to a power, or of dealing with trigonometric functions, appropriate scales for these purposes may be substituted for those herein illustrated, or they may be combined with those illustrated in parallel spirals upon the respective cylinders. This may be found advantageous in many calculations.

Where such operations as raising a number to a power or extracting the root of a number are to be performed, it is sometimes found of advantage, when the two scales are operated in conjunction with each other, to cause the indicator to move over one scale relatively at the rate of a multiple of the rate at which the indicaor on the related scale moves. This may be accomplished by changing the base of the length of the logarithmic scales on the related cylinders, for instance, having the base of one twice the length of the other, or by changing the size of the cylinders whereby one cylinder when operated in conjunction with the other, will revolve at the rate of a multiple of the other cylinder, or by any well known mechanical means.

What we claim as our invention is:

1. In combination, a spiral scale, an indicator therefor, a coöperating spiral scale, an indicator therefor, means to adjust each indicator independently to any desired point on its scale, and means to cause corresponding relative movement between the two scales and their respective indicators.

2. In combination, a spiral scale, an indicator therefor, a coöperating spiral scale, an indicator therefor, means permitting independent relative movement between each indicator and its scale, and means for causing corresponding relative movement between the two indicators and their respective scales.

3. In combination, two spiral scales, means to move each independently of the other and to move both in unison, two indicators, one for each scale, means permitting each indicator to be adjusted to any point on its own scale, and means to cause both indicators to move in unison on their respective scales.

4. In combination, a series of spiral scales, a cylinder upon which such scales are mounted, an indicator for such scale, a lead screw upon which such indicator is connected, means connecting such lead screw to such cylinder, means permitting the releasing of such indicator from such lead screw; a second spiral scale, a cylinder upon which such scale is mounted, an indicator for such scale, a lead screw to which such indicator is connected, means permitting the releasing of such second indicator from the second lead screw, means connecting the second lead screw to the second cylinder, means for connecting such cylinders, means for rotating each cylinder independently, means for rotating both cylinders in unison.

5. In combination, two spiral scales, two cylinders upon which such scales are mounted, an indicator for each scale, a clutch by means of which such cylinders may be engaged; two lead screws, means connecting one lead screw to each cylinder, means connecting an indicator to each lead screw, means for rotating each cylinder, means for rotating both cylinders in unison.

6. In combination two spiral scales, an indicator for each scale, two cylinders upon which such scales are mounted, a lead screw connected to each indicator, means for releasing each indicator from its lead screw, means for connecting each lead screw to its cylinder, a clutch by which both cylinders may be connected, means for rotating each cylinder independently, means for rotating both cylinders in unison, a brake for each cylinder provided with means for releasing such brake singly or both brakes in unison.

7. A calculating machine comprising, in combination, a plurality of scales, an indicator movable over each scale, means to set any indicator at a desired point on its scale and means to uniformly move the indicators over their respective scales in unison whereby mathematical problems may be solved.

8. A calculating machine comprising, in combination, a plurality of scales, an indicator movable over each scale, means to move said indicators independently over the respective scales whereby any indicator may be set at a desired point on its scale and means whereby all indicators may be moved in unison each over its respective scale whereby to solve mathematical problems.

In witness whereof, we hereunto subscribe our names this 14th day of September, A. D. 1920.

MILLARD B. KENNEDY.
VERNE C. KENNEDY.